Figure 1:
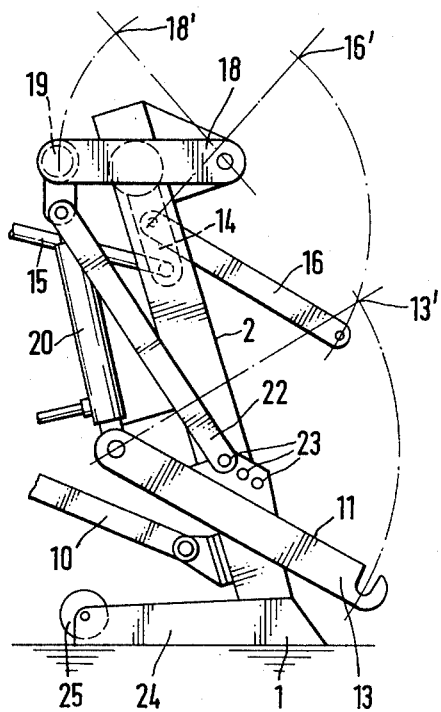

United States Patent [19]

Dreyer

[11] 4,234,129
[45] * Nov. 18, 1980

[54] MOUNTING DEVICE FOR AGRICULTURAL SPREADING MACHINES

[75] Inventor: Heinz Dreyer, Hasbergen-Gaste, Fed. Rep. of Germany

[73] Assignee: Amazonen-Werke H. Dreyer GmbH & Co. KG, Hasbergen-Gaste, Fed. Rep. of Germany

[*] Notice: The portion of the term of this patent subsequent to Nov. 15, 1994, has been disclaimed.

[21] Appl. No.: 798,524

[22] Filed: May 19, 1977

[30] Foreign Application Priority Data

May 20, 1976 [DE] Fed. Rep. of Germany ....... 2622444

[51] Int. Cl.[2] .................. A01C 19/00; B62D 49/02
[52] U.S. Cl. ................................. 239/661; 172/448; 180/14 R; 280/456 A; 280/461 A; 414/703
[58] Field of Search ............ 239/661, 665, 676, 670; 280/456 A, 460 A, 461 A, 478 R, 479 R; 180/14 R, 53 C; 111/10–14; 172/448, 47; 214/766; 414/703

[56] References Cited

U.S. PATENT DOCUMENTS

| | | | |
|---|---|---|---|
| 3,078,930 | 2/1963 | Foote | 172/448 X |
| 3,964,681 | 6/1976 | Herd | 239/661 X |
| 4,019,753 | 4/1977 | Kestel | 280/479 R X |
| 4,058,180 | 11/1977 | Dreyer | 280/456 A X |

FOREIGN PATENT DOCUMENTS

| | | | |
|---|---|---|---|
| 7019086 | 5/1970 | Fed. Rep. of Germany | 280/461 A |
| 1330998 | 5/1963 | France | 239/661 |

Primary Examiner—Andres Kashnikow
Attorney, Agent, or Firm—Sprung, Felfe, Horn, Lynch & Kramer

[57] ABSTRACT

A mounting device for mounting a spreading machine on a tractor. The device (FIG. 2; a front view) comprises an upright frame 2 outfitted with linkages for connection to the tractor and the spreader and a hydraulic system 20 for adjusting the elevation of the spreader on the mounting device for mid-season spreading of fertilizer. The construction is such that an open area 6 is provided to accommodate pivoting of a drive shaft 8 extending from the power take-off of the tractor to the spreader when the spreader is elevated.

15 Claims, 7 Drawing Figures

MOUNTING DEVICE FOR AGRICULTURAL SPREADING MACHINES

BACKGROUND

The invention concerns a mounting device for argicultural spreading machines which has an upright frame equipped with means for coupling it to the toplink and to the lift arms of the three-point hydraulic lift of a tractor, on which a spreading machine driven by the tractor power takeoff shaft and provided with outlet openings can be mounted and can be raised and lowered by means of a hydraulic system.

A mounting device of this kind is known through German Gebrauchsmuster No. 70 19 086. In this mounting device the frame consists of an upright carrier to whose bottom end there is rotatably mounted an intermediate shaft which, when the mounting means is in the working state, is attached for power transmission to the tractor power takeoff shaft through a universal shaft on the one hand and on the other hand to the drive shaft of the mounted spreading machine through a belt or chain drive. Furthermore, the system for holding the mounting means of the spreading machine can consist either of lift arms pivotingly disposed on the carrier or of a guide disposed displaceably on the carrier. By means of this mounting device the spreading machine is to be easy to fill with material on the one hand, and on the other hand it is to be usable at different distances above the ground, especially for the mid-season spreading of fertilizers.

Regardless of which embodiment of this known mounting device is used, it has the disadvantage that its use is limited to a relatively narrow range of heights above the ground. For if the means for holding the spreading machine consists of lift arms, even in the event of a slight change in the operating level of the spreading machine, not only is there a change in the distance, but also there is an axial displacement of the two shafts of the belt or chain drive with respect to one another, so that, even if it is equipped with a tightening device, this drive loses its ability to operate. If, however, the holding means has a displaceably disposed guide, the two shafts of the belt or chain drive would have to be carried past one another laterally from the upper operating position through the normal operating position to the lowermost operating or loading position. Even if this were possible, it would be necessary, for example, in the normal position of the spreading machine, for all of the distance existing between the two shafts in the upper position to be equalized by a lateral movement of the tightening means. Such a tightening means, however, in view of the safety regulations existing in all countries, would result in such complications that it could not be constructed for practical use in agriculture.

Furthermore, in the known mounting device there exists this disadvantage that, regardless of its construction, the attachment of the spreading machine to it and its removal therefrom requires a considerable expenditure of time, since for this purpose the entire chain or belt drive, at least, must be disassembled from the machine.

THE INVENTION

The invention is addressed to the problem of improving the known mounting device in such a manner that reliable and easily detachable drive of the spreading machine will be achieved in all of the reachable operating positions as well as in the loading position.

This problem is solved in accordance with the invention in that the frame has an opening in its middle area for the free passage of a universal shaft from the tractor power takeoff shaft to the spreading machine. The easy detachability of the drive is achieved by means of the quick-action couplings present on universal shafts, which are known and therefore will not be described in detail. Nor does it matter whether the spreading machine is a gravity type, broadcast type or blower type spreader, or a field sprayer, or any other kind of spreading machine. Furthermore, these spreading machines can be attached to the mounting device and removed again therefrom quickly and easily.

Lastly, there is the advantage that the spreading machines can be set at a variety of angles to the direction of travel at any working height, if conditions necessitate it, such as, for example, in the case of fertilizer spreaders, when this is required for the purpose of increasing or reducing the spreading width, or for the achievement of identical working widths with various types of fertilizers within specific working heights.

The invention furthermore provides that levers are disposed pivotingly on both sides of the frame, which are connected together at their free ends by a cross member, and are connected by links to the device for holding the lower mounting means of the spreading machine, and that the hydraulic system acts through a hydraulic jack on the cross member. These measures permit a simple and stable construction of the mounting means, the advantage also being obtained that, even when the hydraulic jack is disposed at one side, the lower mounting means of the spreading machine coupled to the lift arms are moved up and down uniformly, i.e., that any undesired tilting of the spreading machine transversely of the direction of travel is prevented.

If in this case the distance between the crossarm of the levers and the arms for lifting the spreading machine by its lower mounting means is variable, the mounting device can easily be adapted to the various types of tractor power lift systems as well as the various positions of the lower mounting means of the spreading machines. Furthermore the lifting range of the spreading machine can in this manner be further increased.

In a preferred embodiment of the invention, provision is furthermore made that the hydraulic jack is disposed laterally beside the opening and below the cross member, and that the cross member forms with the levers an inherently torsion-resistant unit. By these measures the advantage is additionally achieved that the mounting device can be constructed so low that the loading of the spreader can be performed without difficulty from a bulk goods container on the dump platform of a multi-purpose truck, and the uptilting of the dump platform which is required for this purpose will not cause the dump platform to collide with the upper part of the mounting device.

In another advantageous embodiment, the outlet apertures of the spreading machine can be shut off and are adjustable as to their size by means of shutters which can be operated by the hydraulic system. Thus, the hydraulic system that is present for the raising and lowering of the spreading machine can additionally be used for the convenient adjustment of the outlet openings from the driver's seat of the tractor carrying the spreading machine, to achieve a specific rate of output. This measure is also especially important whenever multi-purpose tractors are used with the spreading machines, in which there is a great distance between the driver's cab and the rear power lift.

Figure 2:
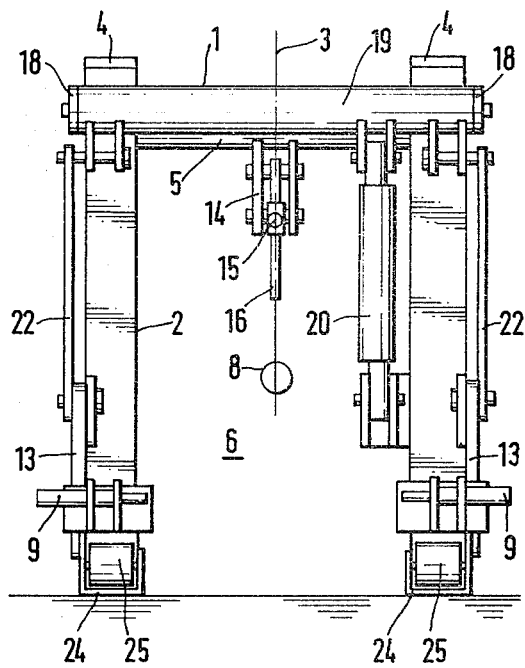
Figure 3:
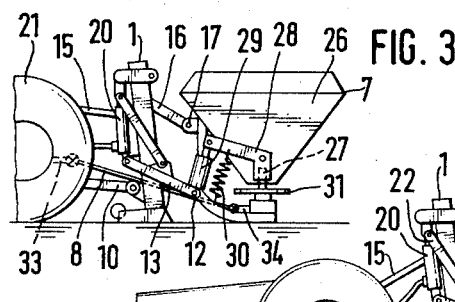
Figure 4:
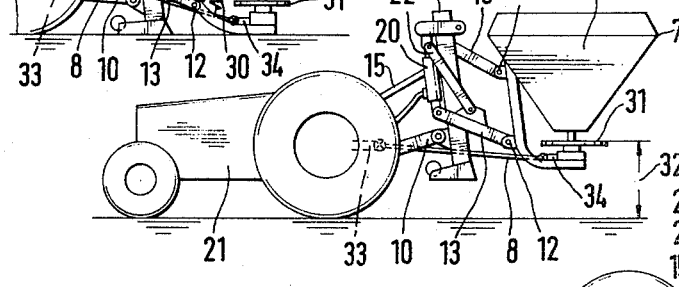
Figure 5:
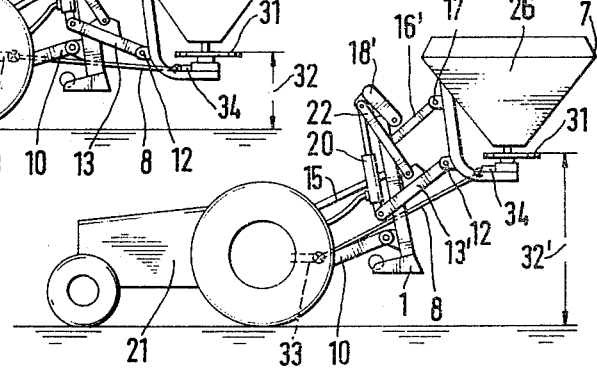
Figure 6:
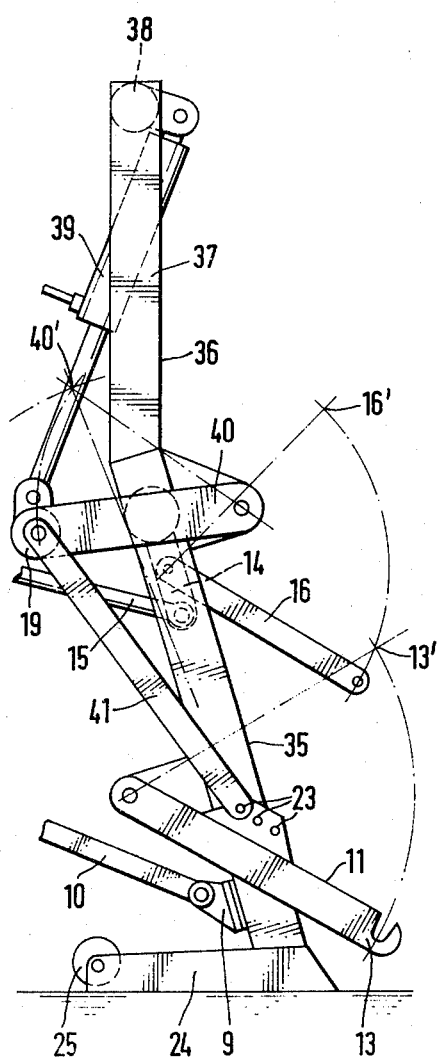
Figure 7:
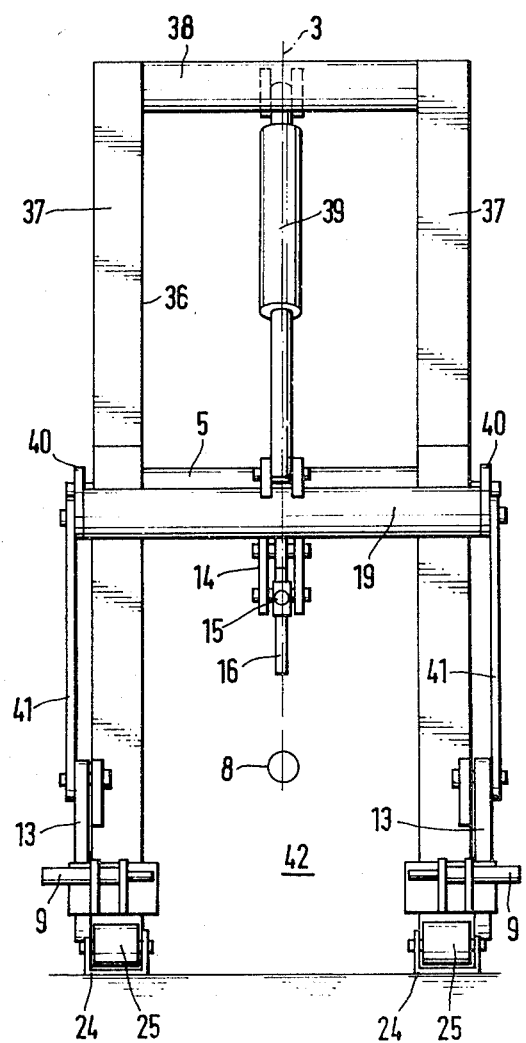

The invention will be further explained with the aid of the appended drawings, wherein FIG. 1 is a side elevational view of a mounting device in accordance with the invention, FIG. 2 is a front elevational view of the same mounting device, FIG. 3 is a side elevational view on a reduced scale of the same mounting device on a tractor, carrying a spreading machine in the form of a centrifugal fertilizer spreader, with the latter in the lowermost, loading position, FIG. 4 is a side elevational view of the same mounting device with the centrifugal fertilizer spreader in the normal working position, FIG. 5 is a side elevational view of the same mounting device with the centrifugal fertilizer spreader in the elevated, mid-season fertilizing position, FIG. 6 is a side elevational view of another mounting device in accordance with the invention, and FIG. 7 is a front view of the same mounting device.

The mounting device 1 represented in FIGS. 1 to 5 has an upright frame 2 which consists essentially of two upright members 4 disposed one on each side at a lateral distance from the center line 3 of the mounting device 1, and of a cross member 5 joining them together at their upper ends. This results in an open space 6 between the upright members 4 and below the cross member 5, through which a universal shaft 8, represented by a circle in FIG. 2, can pass freely, which is provided for the driving of the spreading machine 7 represented in FIGS. 3 to 5 in the form of a centrifugal fertilizer spreader.

On these upright members 4 there are provided not only the coupling draw pins 9 for the lift arms 10 of a tractor power lift, but also the lift means 11 for lifting the spreading machine 7 by its bottom mounting means 12, the lift means 11 consisting of two lift arms 13. On the other hand, the coupling means 14 for the toplink 15 of the tractor's power lift and for the toplink 16 serving for connection to the top pins 17 of the spreading machine 7, are fastened centrally to the cross member 5.

Furthermore, the levers 15 are pivoted at the upper end of the upright members 4, their ends being joined together by the crossbar 19. The hydraulic cylinder 20, which is a single-action cylinder, is linked to this crossbar at a distance laterally from the center line 3 of the mounting device 1, the other end of said hydraulic cylinder being supported on the left upright member 4. Thus, the hydraulic cylinder 20 is disposed adjacent one of the upright members 4. The hydraulic cylinder 20 is connected in a known and not illustrated manner to the hydraulic system of the tractor 21 carrying the spreading machine 7. Furthermore, the two links 22 are articulated to the outer ends of the crossbar 19, and they are carried externally around the uprights 4 and are joined to the central portion of the lift arms 13, the bores 23 being located at this point so as to enable the lift arms 13, i.e., the lift means 11 for raising the spreading machine 7 by its bottom mounting means 12, to be given different basic settings. This provides means for varying the distance between the crossbar 19 and the lift arms 11.

Lastly, at the bottom ends of the uprights 4 are the parking feet 24 on the front ends of which the wheels 25 are mounted. Thus it is possible to park the mounting device 1 with or without the spreading machine, so as to occupy little space, and to move it about on the floor easily without a tractor. The wheels 25 overreach free ends of the parking feet.

The three different basic positions of the spreading machine 7, in the form of a dual disk centrifugal fertilizer spreader, mounted on the tractor 21 by means of the mounting device 1, are represented in FIGS. 3 to 5. The outlet apparatus 27 are located on both sides on the hopper 26 of the spreading machine are adjustable for different aperture sizes and can be shut off by means of the shutter levers 28. Furthermore, the free ends of the shutter levers 28 are connected each with a hydraulic cylinder 29, these cylinders being connected in a known and not illustrated manner to the hydraulic system of the tractor 21. When the hydraulic cylinders 29 are in the shut-off state, the shutter levers 28 are pulled to their closed position by the springs 30, so that the hydraulic cylinders 29 need to be only single-acting cylinders. Also, as a result of these measures, the outlet apertures 27 can be closed and opened to a set aperture size individually for each spreader disk 31 on each side of the hopper 26, so that unilateral spreading of the material is possible at any desired rate. This type of spreading is very important, especially along the edges of fields.

In the loading position represented in FIG. 3, both the mounting device 1 and the centrifugal fertilizer spreader 7 rest on the ground, so that the fertilizer can be loaded conveniently into the hopper 26 of spreader 7, even by hand. Here the top link 15 and the lift arms 10 of the power lift of the tractor and the toplink 16 and the lift arms 13 of the mounting device 1 are in their lowermost positions and the hydraulic cylinder 20 is in its retracted state.

FIG. 4 shows the centrifugal fertilizer spreader 7 in the normal working position in which the spreader disks 31 of the spreader are at a distance 32 from the ground of about 0.80 m. To reach this position, the power lift of the tractor 21 is operated until its toplink 15 and its lift arms 10 are in an elevated position, while the hydraulic cylinder 20 remains in the retracted state, so that the lift arms 13 and the toplink 16 of the lifting device 1 assume their lowermost position.

In the mid-season fertilizing position represented in FIG. 5, the spreader disks 31 of the spreader 7 are at a distance 32' from the ground of about 1.80 m. Here the top link 15 and the lift arms 10 of the power lift of the tractor 21 are in the raised position. Furthermore, to reach this mid-season fertilizing position, the lift cylinder 20 is fully extended, so that the levers 18 are in the uppermost position 18' and, by means of these levers 18 as well as the links 22, the lifting device lift arms 13 are also raised to their uppermost position 13'. At the same time the toplink 16 is also raised by the fertilizer spreader 7 to its uppermost position 16'.

As it can furthermore clearly be seen in FIGS. 3 and 5, the distance between the power takeoff shaft 33 of the tractor 21 and the drive shaft 34 of the centrifugal fertilizer spreader 7 remains virtually the same in all three basic positions, so that for these basic positions as well as for all possible positions between them, which are not represented, the same universal shaft 8, which is a two-piece shaft in a known manner, can always be used.

The mounting device 35, which is represented in FIGS. 6 and 7, and in which like parts are provided with the same reference numbers as in the first embodiment, differs substantially from the mounting device 1 in that its frame 36 has two bent and substantially longer upright members 37, which are joined together in their middle portion by the cross member 5 and at their upper ends by the cross member 38 in a torsion-resistant manner. The hydraulic cylinder 39, which is a pulling cylinder and is connected to the hydraulic system of the tractor 21, is attached to the upper cross member 38 precisely in alignment with the center line 3 of the mounting device 35, its other end being attached to the crossbar 19 of the levers 40. Furthermore, two links 41 are again articulated at the outer extremities 19 and are joined at one of the bores 23 to the lift arms 13 of the mounting means 11. At the bottom end of the frame 36 the parking feet 24 with the wheels 25 are again provided.

The procedures for the raising of a spreading machine are performed in accordance with the description given for the mounting device 1. In this case, to reach the raised, mid-season fertilizing position, the entire mounting device 35 is lifted by means of the lift arms 10 and toplink of the power lift of the tractor. The raising of the spreading machine on the mounting device 35 is performed by activating the hydraulic cylinder 39, whereby the levers 40 are moved to their upper position 40' and the lift arms 13 of the lifting means 11 are raised to their upper position 13'. Then, the toplink 16 of the mounting means, which is articulated together with the tractor's power lift toplink by the coupling means 14 to the cross member 5, is moved by the spreading machine to the upper position 16'.

The advantages of this mounting device 35 consist in the fact that it provides a greater opening 42 between the uprights 37 and below the cross member 5 for the universal shaft 8 than in the case of mounting device 1, and that, due to the central arrangement of the hydraulic cylinder 39, the hangers 41 do not have to be joined to the crossbar 19 in a torsion-resistant manner. It is disadvantageous that the spreading machine mounted on the mounting device 35 cannot be loaded from a bulk goods container mounted on the dump platform of a multi-purpose tractor.

I claim:

1. In a mounting device for an argricultural spreading machine, which has an upright frame equipped with coupling means for mounting of the device on a tractor power lift, and coupling means for mounting of a spreading machine, driven by a power takeoff shaft of the tractor and equipped with outlet apertures, on the device, and lift means for raising and lowering the elevation of the spreading machine on the device, the improvement which comprises there being only one of said lift means, the upright frame having an open middle area for the free passage and pivoting of a universal shaft connecting the tractor power takeoff to the spreading machine during raising and lowering of the spreading machine on the device, the upright frame having two upright members disposed one on each side at an equal distance from the center line of the mounting device and joined together by a cross member, the lift means being located outside of said open middle area, the mounting device comprising lift arms pivotally connected to the upright frame members and having means for mounting of the spreading machine thereon, the lift means being linked to the lift arms for said raising and lowering of the spreading machine on the mounting device, the linkage of the lift means to the lift arms comprising levers, each pivotally mounted at one end thereof on the upright frame members, the other ends of the levers being joined together by a crossbar, links connecting said other ends to the lift arms, the lift means being operatively connected to the crossbar and the upright frame for said raising and lowering of the lift arms and thereby the spreading machine.

2. Mounting device of claim 1, and means for varying the distance between the crossbar and the lift arms.

3. Mounting device of claim 1, the lift means comprising a cylinder disposed adjacent one of the upright members and below the crossbar to provide said open middle area.

4. Mounting device of claim 1, and a connecting link for connecting the mounting device to the tractor and a connecting link for connecting the mounting device to the spreading machine, said connecting links being connected to said cross member.

5. Mounting device of claim 1, and parking feet disposed at the bottom end of the frame.

6. Mounting device of claim 5, and wheels rotatably mounted at the free ends of the parking feet, the wheels overreaching the free ends of the parking feet.

7. Mounting device of claim 1, and the mounting device having mounted therein adjustable closure means for adjustment of the opening size of outlet apertures of the spreading machine, and hydraulic means for control of the adjustable closure means.

8. Mounting device according to claim 1, the lift means being disposed in alignment with the center line of the mounting device and above the crossbar, said connection to the upright frame being by means of a second cross member of the upright frame disposed above the crossbar.

9. Mounting device of claim 8, and means for varying the distance between the crossbar and the lift arms.

10. Mounting device of claim 8, and a connecting link for connecting the mounting device to the tractor and a connecting link for connecting the mounting device to the spreading machine, said connecting links being connected to said first mentioned cross member.

11. Mounting device of claim 8, and parking feet disposed at the bottom end of the frame.

12. Mounting device of claim 11, and wheels rotatably mounted at the free ends of the parking feet, the wheels overreaching the free ends of the parking feet.

13. Mounting device of claim 8, and the mounting device having mounted therein adjustable closure means for adjustment of the opening size of outlet apertures of the spreading machine, and hydraulic means for control of the adjustable closure means.

14. Mounting device of claim 8, the left means comprising a hydraulic cylinder.

15. Mounting device of claim 11, the lift means comprising a hydraulic cylinder.

* * * * *

UNITED STATES PATENT AND TRADEMARK OFFICE
CERTIFICATE OF CORRECTION

PATENT NO. : 4,234,129
DATED : November 18, 1980
INVENTOR(S) : Heinz Dreyer

It is certified that error appears in the above—identified patent and that said Letters Patent is hereby corrected as shown below:

Col. 3, line 45, change "15" to -- 18 --.

Col. 4, line 9, change "aparatus" to -- apertures".

Col. 4, line 9, delete "are".

Col. 6, line 57, change "left" to -- lift --.

Col. 6, line 59, change "11," to -- 1, --.

Signed and Sealed this

Nineteenth Day of May 1981

[SEAL]

Attest:

RENE D. TEGTMEYER

*Attesting Officer*  *Acting Commissioner of Patents and Trademarks*